US008443324B2

(12) United States Patent
Alpert et al.

(10) Patent No.: US 8,443,324 B2
(45) Date of Patent: May 14, 2013

(54) ROUTING AND TIMING USING LAYER RANGES

(75) Inventors: Charles Jay Alpert, Austin, TX (US);
Shiyan Hu, Houghton, MI (US); Zhuo Li, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 13/047,492

(22) Filed: Mar. 14, 2011

(65) Prior Publication Data

US 2012/0240093 A1 Sep. 20, 2012

(51) Int. Cl.
*G06F 17/50* (2006.01)

(52) U.S. Cl.
USPC ........... 716/126; 716/119; 716/129; 716/130; 716/131; 716/135

(58) Field of Classification Search ........... 716/119–135
See application file for complete search history.

(56) References Cited

U.S. PATENT DOCUMENTS

| | | | |
|---|---|---|---|
| 6,557,145 B2 | 4/2003 | Boyle et al. | |
| 7,216,327 B2* | 5/2007 | Yaguchi et al. | 716/130 |
| 7,614,028 B1 | 11/2009 | Nesquist et al. | |
| 7,661,085 B2 | 2/2010 | Cho et al. | |
| 7,853,915 B2 | 12/2010 | Saxena et al. | |
| 7,984,413 B2* | 7/2011 | Orita et al. | 716/137 |
| 7,996,812 B2* | 8/2011 | Kotecha et al. | 716/134 |
| 2003/0088841 A1* | 5/2003 | Teig et al. | 716/8 |
| 2004/0025134 A1* | 2/2004 | Jung et al. | 716/13 |
| 2005/0240888 A1* | 10/2005 | Bacchus et al. | 716/6 |
| 2006/0005153 A1* | 1/2006 | Maruyama et al. | 716/5 |
| 2007/0180420 A1* | 8/2007 | Bacchus et al. | 716/10 |
| 2007/0214446 A1* | 9/2007 | Lavin et al. | 716/12 |
| 2009/0019415 A1* | 1/2009 | Lavin et al. | 716/12 |
| 2009/0106709 A1* | 4/2009 | Carney et al. | 716/2 |
| 2009/0144688 A1* | 6/2009 | Uchino et al. | 716/12 |
| 2009/0319977 A1* | 12/2009 | Saxena et al. | 716/13 |
| 2011/0061037 A1* | 3/2011 | Croysdale et al. | 716/122 |
| 2011/0061038 A1* | 3/2011 | Qiao et al. | 716/126 |
| 2011/0161904 A1* | 6/2011 | Kondou et al. | 716/114 |

OTHER PUBLICATIONS

Hunt et al; Dynamic Routing and Congestion Control Through Random Assignment of Routes, May 2008.
Jing et al; A Novel and Efficient Timing-Driven Global Router for Standard Cell Layout Design Based on Critical Network Concept, I-165 - I-168, 2002 (IEEE).
Chattopadhyay et al; An Overview of Placement and Routing Algorithms for Multi-Chip Modules, 1-43, 2008-2009.
Moffitt et al; MaizeRouter: Engineering an Effective Global Router, 226-231, 2008(IEEE).

* cited by examiner

*Primary Examiner* — Thuan Do
*Assistant Examiner* — Nha Nguyen
(74) *Attorney, Agent, or Firm* — Garg Law Firm, PLLC; Rakesh Garg; Eusthus D. Nelson (57) ABSTRACT

A method, system, and computer program product for improved routing using layer ranges in the design of an integrated circuit (IC) are provided in the illustrative embodiments. Using an application executing in a data processing system, a score is computed for a net in a set of nets routed using a set of layers in the design. The set of nets is sorted according to scores associated with nets in the set of nets. A layer range from a set of layer ranges is assigned to a net in the sorted list such that a net with a higher than threshold score is assigned a high layer range.

18 Claims, 4 Drawing Sheets

ROUTING AND TIMING USING LAYER RANGES

BACKGROUND

1. Technical Field

The present invention relates generally to a method, system, and computer program product for designing an integrated circuit. More particularly, the present invention relates to a method, system, and computer program product for improving the routing of the design of the integrated circuit (IC) using layer ranges.

2. Description of the Related Art

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry. An interconnected group of components is called a net.

The software tools manipulate these components at the components level, or blocks of components level. A block of components is also known as a cell. A cell in an IC design is a portion of the IC design. One way of identifying cells in an IC design is to overlay a grid of imaginary vertical and horizontal lines on the design, and deeming each portion of the IC design bound by horizontal and vertical lines as a cell. The horizontal or vertical lines bounding a cell are called cut-lines.

Cells formed in this manner are commonly known as global routing cells, or g-cells. Imposing such a grid on an IC design abstracts the global routing problem away from the actual wire implementation and gives a more mathematical representation of the task. A net may span one or more cells and may cross several cut lines.

An IC design software tool can, among other functions, manipulate cells, or interconnect components of one cell with components of other cells, such as to form nets. The interconnects between components are called wires. A wire is a connection between parts of electronic components, and is formed using a metallic material that conducts electricity.

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement.

A wire can be designed to take any one of the several available paths in a design. Placement of a wire on a certain path, or track, is a part of routing.

A layer is typically designated to accommodate wires of a certain width (wire code). Generally, the wider the wire width of a layer, the faster the signal propagation speed for the net routed on that layer. Faster layers, to with, layers with larger wire widths, can accommodate fewer components or nets as compared to slower layers with narrower wire widths.

A router is a component of an IC design tool that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into small tiles and attempts to route nets through the tiles such that no tile overflows its capacity. After global routing, wires must be assigned to actual tracks within each tile, followed by detail routing which must connect each global route to the actual pin shape on the cell. Another type of router—known as the detailed router—performs the detailed routing. The global and detailed routing produced during the design process is collectively referred to as "routing" and is usually further modified during optimization of the design.

SUMMARY

The illustrative embodiments provide a method, system, and computer program product for improved routing using layer ranges. An embodiment computes, using an application executing in a data processing system, a score for a net in a set of nets routed using a set of layers in the design. The embodiment sorts the set of nets according to scores associated with nets in the set of nets. The embodiment assigns a layer range from a set of layer ranges to a net in the sorted list such that a net with a higher than threshold score is assigned a high layer range.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Presently, routing of an IC design is performed using a variety of constraints. For example, a designer may specify a wire code for a particular net causing the net to be routed on a layer that can accommodate that wire code. As another example, a designer may specify the maximum wire length for a net, causing the router to determine a routing solution for that net that honors that wire length constraint. As another example, a designer may specify that a particular net should be routed using only certain layers (layer constraint). When a constraint is not specified for a net, the router is free to route the net using any available layers and the objective is to finish the routing without any error, such as "open" and "short".

The invention recognizes that presently layer assignment of nets can be timing criticality based. In other words, a designer assigns a layer constraint to a net when the net is determined to be timing critical. The invention further recognizes that present methods for designer-assigned layer constraints is usable for constraining only tens or hundreds of nets to certain layers, whereas a modern design may contain tens of millions of nets.

The invention recognizes that routing nets on certain layers may result in an improved routing solution. For example, a routing solution where tens of thousands or millions of nets can be subjected to layer constraints may have better timing or congestion characteristics as compared to a routing solution where only hundreds of nets are so constrained. However, the invention also recognizes that assigning layer constraints to all or a significant fraction of nets in a modern IC design is not practically possible by using presently available manual methods of layer assignment.

The illustrative embodiments used to describe the invention generally address and solve the above-described problems and other problems related to routing an IC design. The illustrative embodiments provide a method, system, and computer program product for improved routing of an IC design using layer ranges.

A layer range is a range, group, collection, or set of one or more layers available for routing an IC design. One layer range may be a subset of another layer range. Two layer ranges may overlap such that some layers may be common to both layer ranges. A layer range may also be distinct from another layer range in that the two layer ranges may not include any layers that are common to both layer ranges.

As used in this disclosure, a high or higher layer is higher than a threshold level of layer. As used in this disclosure, a low or lower layer is lower than the threshold level of layer. As used in this disclosure, a high or higher layer range is a layer range including a high layer, and is higher relative to another layer range in the design. As used in this disclosure, a low or lower layer range is a layer range including a low layer, and is lower relative to another layer range in the design.

While some embodiments are described with respect to each net in a design, an implementation may use an embodiment with respect to less than all the nets in the design without departing the scope of the invention. For example, an implementation may assign layer ranges to some but not all the nets in a design in the manner of an embodiment without departing the scope of the invention.

The illustrative embodiments are described with respect to certain ICs or circuits only as examples. Such descriptions are not intended to be limiting on the invention. For example, an illustrative embodiment described with respect to a microprocessor design can be implemented with respect to any other IC design whose routing can be improved using layer ranges.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
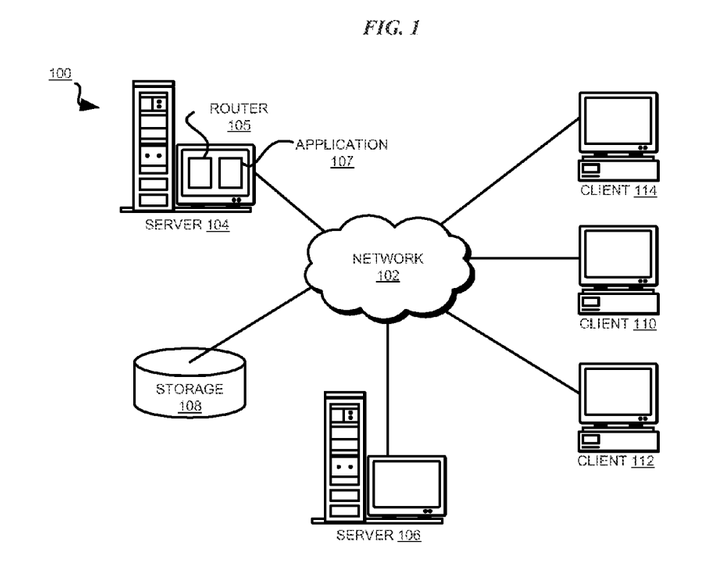
FIG. 1 depicts a pictorial representation of a network of data processing systems in which illustrative embodiments may be implemented.
Figure 2:
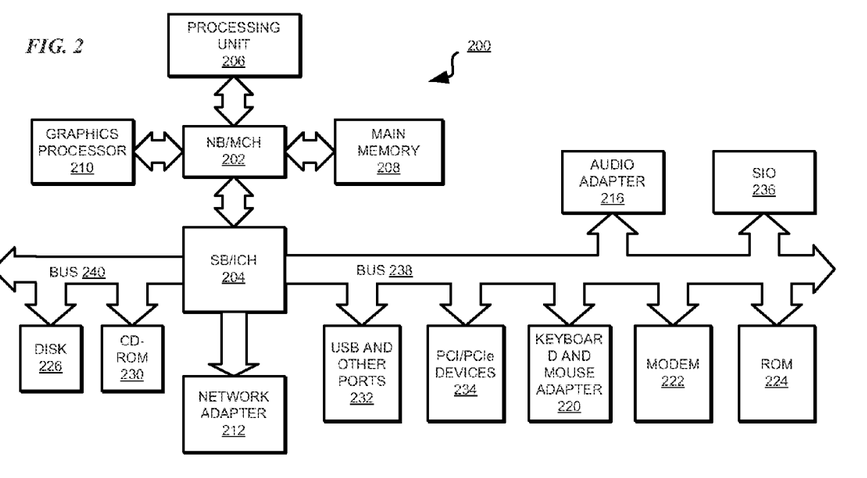
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include router 105 that may be improved using an embodiment. Application 107 may be any combination of hardware and software usable for implementing an embodiment of the invention such that the embodiment is usable with router 105 for creating an improved routing.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
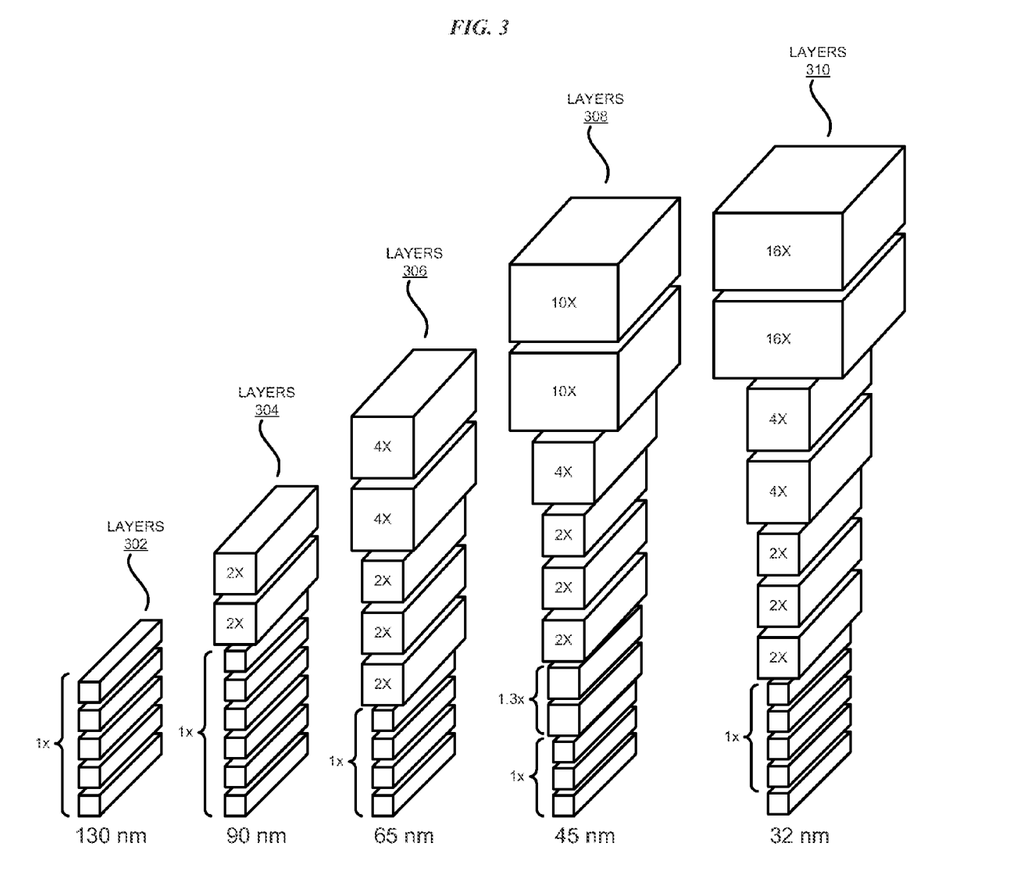
FIG. 3 depicts a block diagram of various types of layers in an IC design with respect to which an illustrative embodiment may be implemented.

With reference to FIG. 3, this figure depicts a block diagram of various types of layers in an IC design with respect to which an illustrative embodiment may be implemented. Routing can be performed on layers 302, 304, 306, 308, or 310 using router 105 in conjunction with application 107 in FIG. 1.

As an example, the half pitch of a typical memory cell may be 45 nm. The minimum metal width on a 1× layer is usually approximately two times that half pitch, thus equaling approximately 90 nm in this example. A 1.3× layer accommodates a route width that is one hundred thirty percent of the width on a 1× layer. Similarly, a 2× layer accommodates a route width that is twice the width on a 1× layer. A 4× layer accommodates a route width that is four times the width on a 1× layer. A 10× layer accommodates a route width that is ten times the width on a 1× layer. A 16× layer accommodates a route width that is sixteen times the width on a 1× layer. In fact, the thickness of different layers is different, which is another reason why the layers have different propagation speeds.

Layers 302 represent a set of 1× layers as is typically available for routing a 130 nanometer (nm) IC design. Layers 304 represent a set of 1× layers and 2× layers as is typically available for routing a 90 nanometer (nm) IC design. Layers 306 represent a set of 1× layers, 2× layers, and 4× layers, as is typically available for routing a 65 nanometer (nm) IC design. Layers 308 represent a set of 1× layers, 1.3× layers, 2× layers, 4× layers, and 10× layers, as is typically available for routing a 45 nanometer (nm) IC design. Layers 310 represent a set of 1× layers, 2× layers, 4× layers, and 16× layers, as is typically available for routing a 32 nanometer (nm) IC design.

A wider route width translates into a faster net, which means an electrical signal transmits faster on such net. Accordingly, the signal on a net routed on a 2× layer will be faster than the signal on the same net on a 1× layer; a net routed on a 4× layer will be faster than the same net on a 2× layer; and so on.

As the invention recognizes, a faster layer also has scarcer resources. In other words, a faster layer accommodates fewer components due to the larger route widths. Therefore, even when fast nets are desirable, such as for meeting a timing constraint, not all the nets can be placed on the fastest (top) layers, as doing so will cause increased congestion on those layers. Placing the nets on slower (lower) layers may reduce the congestion problem, but causes the nets to perform comparatively slower. To meet timing constraints with slow nets, the nets have to be buffered, causing increased power consumption and design area.

A modern IC design can contain up to tens of millions of nets. A designer usually assigns layer constraints to only a very small fraction of these nets, perhaps to a few hundred nets. The optimization step of the IC design process cannot predict what layers the router will select for the given nets.

If the optimization step takes a pessimistic approach and assumes that the router will place the net on slower layers, the optimization step introduces buffers in the nets to overcome timing delays due to placement on the slower layers. By doing so, the circuit optimizer increases the power consumed and the area occupied by the design. If the optimizer takes an optimistic approach and assumes that the router will place the nets on the higher layers, the optimizer is faced with congestion on the higher layers and a hard-to-recover post-routing timing problem.

Therefore, routing the nets on certain layers is a non-trivial problem. An embodiment or a modification described or contemplated herein can be used for improved routing of all or a significant fraction of the nets in an IC design by assigning nets to one or more range of layers during the routing phase of the design process.

Figure 4:
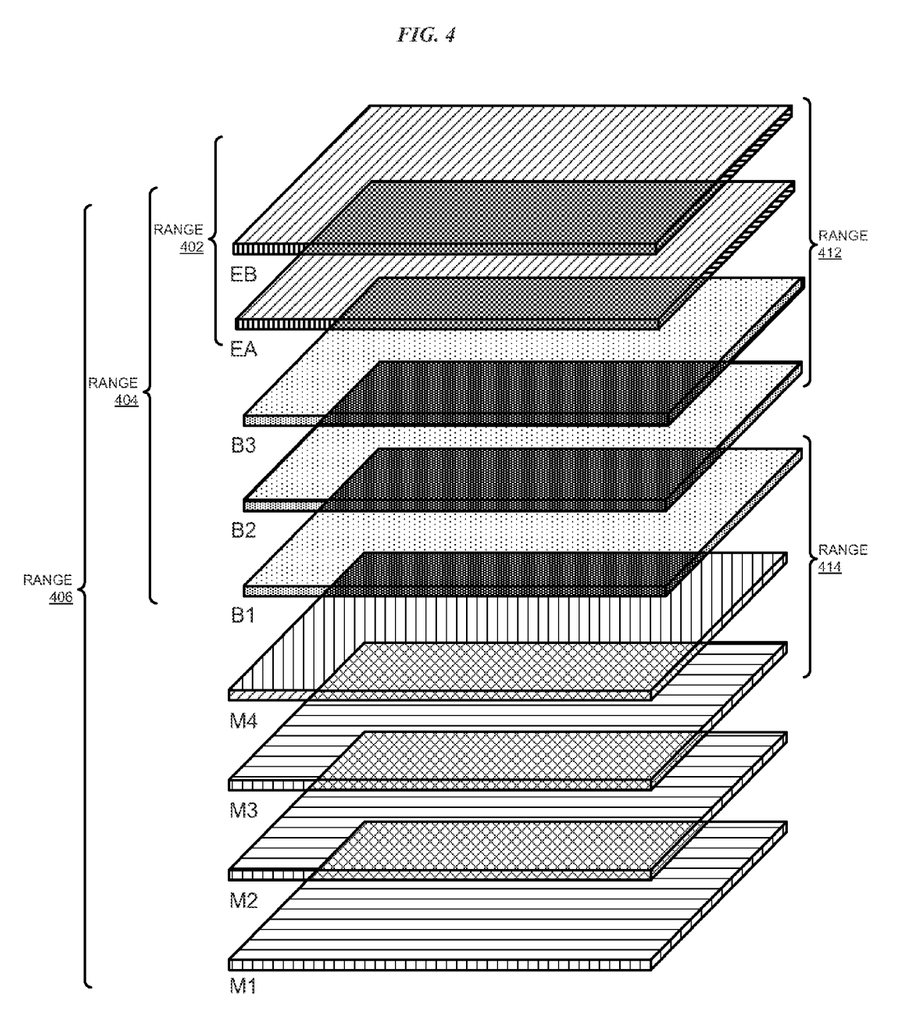
FIG. 4 depicts a block diagram of layer ranges that can be assigned to nets for routing in accordance with an illustrative embodiment.

With reference to FIG. 4, this figure depicts a block diagram of layer ranges that can be assigned to nets for routing in accordance with an illustrative embodiment. For example, range 402 may include layers EA and BE, which may be the 4× layers in layers 306 in FIG. 3. Similarly, range 404 may include the 4× layers and layers B1, B2, B3, which may be the 2× layers in layers 306 in FIG. 3. Range 406 may include the 4× layers, the 2× layers, and layers M1, M2, M3, and M4, which may be the 1× layers in layers 306 in FIG. 3.

As another example of creating layer ranges, range 412 is shown to include some of range 402 layers and some of range 404 layers, and range 414 is shown to include some of range 404 layers and some of range 406 layers without overlapping with range 412. The layer ranges are depicted in this manner only for simplifying the description of the figure and are not intended to be limiting on the invention. Generally, but not necessarily, layer ranges that do not overlap may offer a routing solution with improved congestion (reduced congestion), and layer ranges that overlap each other may offer a routing solution with improved timing consistency (smaller delays).

The improved routing using layer ranges according to an embodiment allows for automatically generating layer constraints for every net in the design, if needed. The embodiment offers improved repeatability and design stability at least because the optimization, the timing, and the routing are synchronized for using predetermined layer ranges for the nets in question. In other words, the optimization and the routing use the same layer ranges for each net being considered in those steps. An additional advantage of an embodiment may therefore be improved power consumption and area of the design, and improved predictability with post-routing timing of the design.

In one embodiment, layer ranges may be assigned to various nets in a simplified post processing manner. For example, the router may be executed and the nets routed on the available layers as in the prior art. The embodiment then determines that certain nets occupy certain layers more than others. For example, after routing, net N1 may occupy layers M3, M4, M5, M9, and return back to layer M3. The embodiment may determine that more than a certain percentage of the wire of net N1, for example, more than fifty percent, is on layers M3 and M4. The embodiment may assign layers M3 and M4, to with, layer range M3 to M4, to net N1. The embodiment may analyze other nets in a similar manner, with same or different percentage or other criteria, and assign layer ranges.

Some nets may be assigned a layer range by default or different criteria. For example, not all nets may be analyzed, and the nets not analyzed may be assigned the entire layer range, to with, any available layer in the design. The router may then be executed again with the assigned layer ranges for each net.

This simplistic post-processing manner of layer range assignment may not be suitable under certain circumstances. For example, in some cases, this manner of layer range assignment may cause or exacerbate a congestion problem on certain layers.

In another embodiment, layer ranges may be assigned to nets in a more sophisticated manner. For example, the router may be executed and the nets routed on the available layers as in the prior art. The embodiment may then compute a score for each net. A net may be assigned a layer range based on the net's score.

A score function may assign a score value to each net based on a predefined rule, condition, or criterion. For example, one way of computing a score value of a net may be the net's routed wire length. The longer the length, the higher the score because the net usually becomes increasingly timing critical as the net's wire length increases. As another example way of computing score values, each cut-line of a cell may be assigned a value depending upon the routed length rank of all the nets crossing that cut-line. Then, a net's score may be computed by adding the routed length rank of each cut-line that the wire of the net crosses. The higher a net's score, the more cut-lines the wires of the net cross, or the higher relative length rank for the cut lines it crosses, or both.

These example scoring methods are described only as examples for the clarity of the embodiments and are not intended to be limiting on the invention. Those of ordinary skill in the art will be able to conceive additional ways of scoring the nets in a design, and the same are contemplated within the scope of the invention. By assigning scores to nets and then sorting the nets by their scores, nets with higher than a threshold scores may be assigned to a higher layer range and vice versa. Another example way of assigning nets to layer ranges may be to assign the top x percent of all the sorted nets to the highest layer range, the next top y percent of all the remaining sorted nets to the next higher layer range, and so on.

The router may be executed again to limit the routing of the nets to their respective assigned layer ranges. The routing—scoring—layer range assignment process can be repeated iteratively until a desirable routing solution is achieved. The iterative repeating in this manner stabilizes the design better than the prior art. In the prior art, even if an acceptable routing solution is achieved, the quality of the design can deteriorate upon optimization and in the next iteration of routing. Using an embodiment, the design does not deteriorate from one routing iteration to the next, such as after optimization, but progressively and consistently improves towards the attaining a desired value of a design characteristic.

Figure 5:
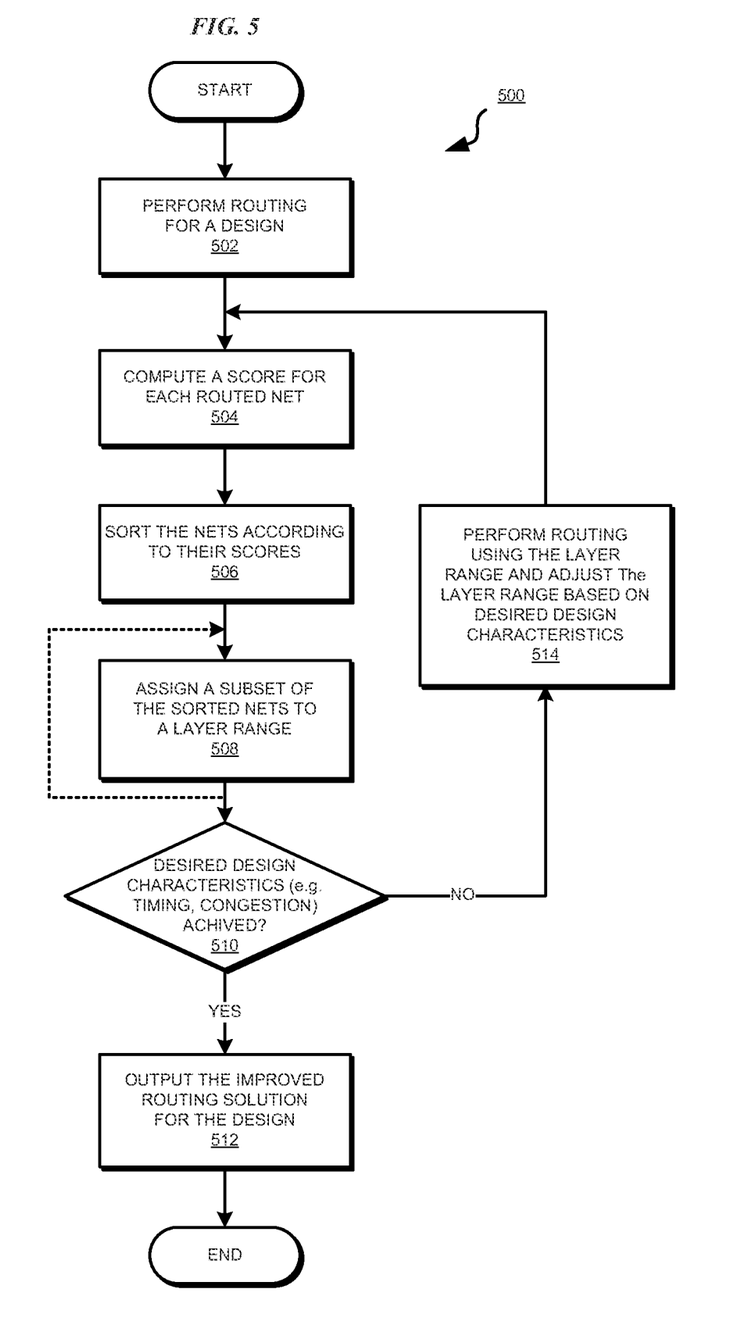
FIG. 5 depicts a flowchart of a process of improving routing by assigning layer ranges to nets in a design in accordance with an illustrative embodiment.

With reference to FIG. 5, this figure depicts a flowchart of a process of improving routing by assigning layer ranges to nets in a design in accordance with an illustrative embodiment. Process 500 may be implemented in a router, such as router 105 in FIG. 1, or in an application, such as application 107 in FIG. 1, that may executed in conjunction with the router.

Process 500 begins by performing routing on a given design (step 502). Process 500 assigns a score to the nets in the routing (step 504). Process 500 may use any suitable scoring function to perform step 504.

Process 500 sorts the scored nets according to their scores (step 506). The sorting of step 506 may sort each net according to the net's score, or may sort the nets into groups based on a range of scores.

Process 500 assigns a subset of the sorted nets to a layer range (step 508). Process 500 may create or identify layer ranges (not shown), such as in the manner of FIG. 4, prior to executing step 508. Furthermore, process 508 may repeat step 508 until all or the desired subsets of scored nets are assigned to various layer ranges.

Process 500 determines whether the desired design characteristics, such as timing, congestion, or other characteristic, have been achieved (step 510). If the desired design characteristics have not been achieved ("No" path of step 510), process 500 routes the design using the layer ranges and adjusts the layer ranges based on routing results and the desired design characteristics, such as congestion (step 514). If the desired design characteristics have been achieved ("Yes" path of step 510), process 500 outputs the improved routing solution for the design (step 512). Process 500 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for improved routing using layer ranges in the design of integrated circuits. Using an embodiment of the invention in an example implementation, a ten to fifty fold increase over the prior art method in the number of nets being assigned a layer range was observed. Furthermore, this increased layer range assignment reduced the congestion in the most congested areas of the design and reduced the slew violations in the design.

An embodiment may improve design closure repeatability and stability. An embodiment may also improve the power consumption and area of the design. An embodiment may be implemented to use rules or policies for layer range creation, net scoring, and layer range assignment.

An embodiment may be implemented so as to retain information from previous layer range creation process and recommend layer ranges for future executions. Similarly, an embodiment may be implemented so as to retain information from previous scoring and layer range assignment processes and recommend layer range assignments for future executions.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for routing using layer ranges in a design of an integrated circuit (IC), the method comprising:

computing, using an application executing in a data processing system, a score for a net in a set of nets routed using a set of layers in the design, wherein the score for the net is a function of a number of cut lines the net crosses;

sorting the set of nets according to scores associated with nets in the set of nets;

assigning a first layer range from a set of layer ranges to a first net in the sorted list;

assigning a second layer range from the set of layer ranges to a second net in the sorted list, the first net having a higher score than the second net, and the first layer range being higher than the second layer range;

routing the first net in the first layer range and the second net in the second layer range, forming an improved routing.

2. The computer implemented method of claim 1, further comprising:

performing an initial routing wherein the set of nets is routed using the set of layers.

3. The computer implemented method of claim 2, further comprising:

outputting the improved routing for the design such that the improved routing demonstrates reduced congestion as compared to congestion in the initial routing.

4. The computer implemented method of claim 2, further comprising:

outputting the improved routing for the design such that the improved routing demonstrates reduced slew violations as compared to slew violations in the initial routing.

5. The computer implemented method of claim 1, further comprising:
creating the set of layer ranges, a layer range in the set of layer ranges including at least one layer available in the design.

6. The computer implemented method of claim 1, wherein the computing uses a scoring function, the scoring function comprising:
assigning a value to each cut line that a wire of the net in the set of nets crosses,
wherein the score for the net value is a sum of values associated with each cut line that the wire of the net crosses.

7. The computer implemented method of claim 1, wherein the sorting groups together those nets whose scores are within a predetermine range of scores.

8. The computer implemented method of claim 1, further comprising:
iteratively repeating the computing, the sorting, the assigning the first layer range, the assigning the second layer range, and routing, until a design characteristic attains a desired value in a version of the improved routing, wherein each iterative repeating stabilizes the design by advancing the design characteristic towards the desired value; and
outputting the version of the improved routing for the design.

9. A computer usable program product comprising a computer usable storage device including computer usable code for routing using layer ranges in a design of an integrated circuit (IC), the computer usable code comprising:
computer usable code for computing, using an application executing in a data processing system, a score for a net in a set of nets routed using a set of layers in the design, wherein the score for the net is a function of a number of cut lines the net crosses;
computer usable code for sorting the set of nets according to scores associated with nets in the set of nets;
computer usable code for assigning a first layer range from a set of layer ranges to a first net in the sorted list;
computer usable code for assigning a second layer range from the set of layer ranges to a second net in the sorted list, the first net having a higher score than the second net, and the first layer range being higher than the second layer range;
computer usable code for routing the first net in the first layer range and the second net in the second layer range, forming an improved routing.

10. The computer usable program product of claim 9, further comprising:
computer usable code for performing an initial routing wherein the set of nets is routed using the set of layers.

11. The computer usable program product of claim 10, further comprising:
computer usable code for outputting the improved routing for the design such that the improved routing demonstrates reduced congestion as compared to congestion in the initial routing.

12. The computer usable program product of claim 10, further comprising:
computer usable code for outputting the improved routing for the design such that the improved routing demonstrates reduced slew violations as compared to slew violations in the initial routing.

13. The computer usable program product of claim 9, further comprising:
computer usable code for creating the set of layer ranges, a layer range in the set of layer ranges including at least one layer available in the design.

14. The computer usable program product of claim 9, wherein the computing uses a scoring function, the scoring function comprising:
computer usable code for assigning a value to each cut line that a wire of the net in the set of nets crosses,
wherein the score for the net is a sum of values associated with each cut line that the wire of the net crosses.

15. The computer usable program product of claim 9, wherein the sorting groups together those nets whose scores are within a predetermine range of scores.

16. The computer usable program product of claim 9, wherein the computer usable code is stored in a computer readable storage medium in a data processing system, and wherein the computer usable code is transferred over a network from a remote data processing system.

17. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

18. A data processing system for routing using layer ranges in a design of an integrated circuit (IC), the data processing system comprising:
a storage device including a storage medium, wherein the storage device stores computer usable program code; and
a processor, wherein the processor executes the computer usable program code, and wherein the computer usable program code comprises:
computer usable code for computing, using an application executing in a data processing system, a score for a net in a set of nets routed using a set of layers in the design, wherein the score for the net is a function of a number of cut lines the net crosses;
computer usable code for sorting the set of nets according to scores associated with nets in the set of nets;
computer usable code for assigning a first layer range from a set of layer ranges to a first net in the sorted list;
computer usable code for assigning a second layer range from the set of layer ranges to a second net in the sorted list, the first net having a higher score than the second net, and the first layer range being higher than the second layer range;
computer usable code for routing the first net in the first layer range and the second net in the second layer range, forming an improved routing.

* * * * *